(12) United States Patent
Tarbox et al.

(10) Patent No.: X9760
(45) Date of Patent: Jun. 22, 1836

(54) STRAW CUTTER

(76) Inventors: Erastus Tarbox; Cyrus F. Kneeland

United States Patent Patent No.: X9760

Erastus Tarbox and Cyrus F. Kneeland.

Letters Patent.

The Schedule referred to in these Letters Patent and making part of the same, containing a description in the words of the said Erastus Tarbox and Cyrus F. Kneeland themselves of their Improvement in the Machine for cutting corn in the ear — straw or grain in the bundle, or other substances for horse provender.

Be it known that I, Erastus Tarbox and Cyrus F. Kneeland of Ogden, in the County of Monroe, and State of New York, have invented a new and useful machine for cutting corn in the ear, straw or grain in the bundle; or other substances for horse provender; which is described as follows. —

The frame is constructed of two bents; the front one consists of three posts 3 feet 2 inches long from shoulder to foot; two of said posts are 4 inches square: the other is 3 by 4 inches, framed together by a cap 3 feet long & 3 by 4 inches square, and at 3 inches from the foot of the posts by a girt of 1 by 4 inches, passing thro the centre of the post — the spaces between the posts being 10 inches. the near or or after bent is composed of two posts framed together at the top by a cap 2 feet long 3 by 4 inches square and at 3 inches from the foot of the posts by a girt 10 inches long from shoulder to shoulder, & 3½ thick by 6 inches wide. The bents are framed together by 4 girts — two on each side the upper girt is framed into the posts at the distance of 11½ inches from the under side of the cap: the lower girts are 2 feet 1 inch from the under side of the cap. — The machine is composed of two Cylinders; — the upper or cutting one is made of cast iron 16 inches in diameter & 8 inches wide, ten 1/2 an inch thick with a flange of one inch projecting
towards the centre. In the face of the cylinder are eight
flutes 5/8ths of an inch deep & 3/4 inches wide for the
reception of the cutters, which are eight in number, made
of steel 8 inches long & 1/2 inch wide with a shank on
each end of 3/2 inches forming a right angle with the blade
& 1/16th of an inch thick & 1 inch wide, let into the edge of the cylin-
der their thickness, and fastened by a bolt passing through
an oblong hole in the shanks & screwed to the flanges
also a bolt passing through the centre of the cutter & thro the
cylinder and fastened by a nut on the inside. The core of
the cylinder is made of four arms and an eye of sufficient
capacity to receive a shaft of two inches in diameter either
square or round; the shaft is 2 feet 4 1/2 inches long with
3/2 inches length of bearing; The lower or grinding cylinder
is also made of cast iron 1 foot in diameter full banded
with wrought iron 1/2 an inch in thickness; which band
is cut in the form of a rasp or file. The core of this cylinder
and the shaft are similar to those of the cutting cylinder.
The upper or cutting cylinder is hung in boxes the centre
of which is dropped 8 1/4 inches below the under side of
the cap on the back side of the front posts. The lower
or grinding cylinder is placed 1 foot 9 1/2 inches below
the under side of the cap on the front side of the front
posts. The concave belongs to the lower cylinder & is the
segment of a circle 13 inches in diameter, with a flange on
the convex side; the concave is 8 inches wide made of
cast iron inlaid with steel bars cut similar to the cylinder,
the concave is fastened at the upper end by a bolt passing
through the casing of the cylinders and the flanges of the
concave; the lower end is fastened by bolting to a block run
-ning in grooves in the posts. beneath this block is another bolted
to the posts, leaving a space of about 3/4 of an inch for the purpose
of of regulating the machine. There are two bolts with screws
passing through the lower block into the upper one, in which
nuts are placed to lower or raise the concave at pleasure.
The apron is 2 feet long & 10 inches wide made of plank &
1½ inch thick, having three flutes, resting at the upper end
in the cap of the rear bent; the lower end resting on a
girt placed across the upper girts of the frame so as to
be moved as occasion may require, secured by bolts
at each end. On the moveable girt is placed a cast iron
throat piece fluted like the apron. The cylinders are
enclosed in wooden boxes lined entirely with sheet iron
for the purpose of preventing waste and wear.
On the upper shaft are two pullies one of 8 in
inches diamr placed near the centre post of the
front bent; the other of 6 inches diamr placed near
the outer post of the same bent. On the lower shaft is
one pulley of 5 inches in diamr with a strap passing from
it to the 8 inch pulley, in the upper shaft.—
The face of the lower cylinder may be cut in furrows
and lands in all the varieties in which Mill stones are
dressed & the concave may be made of cast iron, wrought
iron, steel or French burr, or other stone; & also the
knives or cutters may be placed on the sides of the
cutting cylinder.—
What we claim as our invention and desire
to secure by Letters Patent consists in the before
described Machine for the purposes herein set forth.

Witnesses
Charles H. Chapman
Wm A Chapman

Erastus Tarbox
Cyrus H. Kneeland 990 wds